US008688106B2

(12) United States Patent
Hapsari et al.

(10) Patent No.: US 8,688,106 B2
(45) Date of Patent: Apr. 1, 2014

(54) USER EQUIPMENT AND METHOD IN MOBILE COMMUNICATION SYSTEM

(75) Inventors: Wuri Andarmawanti Hapsari, Tokyo (JP); Anil Umesh, Tokyo (JP); Mikio Iwamura, Tokyo (JP); Hideaki Takahashi, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/643,860

(22) PCT Filed: Apr. 25, 2011

(86) PCT No.: PCT/JP2011/060074
§ 371 (c)(1),
(2), (4) Date: Jan. 3, 2013

(87) PCT Pub. No.: WO2011/136181
PCT Pub. Date: Nov. 3, 2011

(65) Prior Publication Data
US 2013/0102303 A1     Apr. 25, 2013

(30) Foreign Application Priority Data

Apr. 30, 2010 (JP) ................................ 2010-105996

(51) Int. Cl.
*H04W 4/00* (2009.01)
(52) U.S. Cl.
USPC ......... 455/422.1; 455/423; 455/436; 370/331
(58) Field of Classification Search
USPC ................. 455/422.1, 423, 436; 370/331
See application file for complete search history.

(56) References Cited

U.S. PATENT DOCUMENTS

| 2011/0183662 A1* | 7/2011 | Lee et al. ............. 455/422.1 |
| 2011/0194441 A1* | 8/2011 | Jung et al. ............... 370/252 |
| 2013/0034013 A1* | 2/2013 | Jung et al. ............... 370/252 |

FOREIGN PATENT DOCUMENTS

| JP | 2002-335202 A | 11/2002 |
| JP | 2009-116624 A | 5/2009 |

OTHER PUBLICATIONS

International Search Report issued in PCT/JP2011/060074 mailed Jul. 26, 2011 (4 pages).
Written Opinion issued in PCT/JP2011/060074 mailed Jul. 26, 2011 (3 pages).
NTT Docomo, Inc.; "Protocol architecture for logged MDT"; 3GPP TSG-RAN2#69bis, R2-102453; Beijing, China; Apr. 12-16, 2010 (5 pages).

(Continued)

*Primary Examiner* — Amancio Gonzalez
(74) *Attorney, Agent, or Firm* — Osha Liang LLP

(57) ABSTRACT

User equipment having operating modes of at least a connected mode (CONN) and an idle mode (IDLE) includes a measurement unit configured to measure radio quality in the idle mode in accordance with measurement target information indicating that the user equipment is preset to report a measurement value of the radio quality to a base station, a storage unit configured to store the measurement target information and the measurement value of the radio quality measured by the measurement unit and a transmitting unit configured to, if a predefined report condition (log exist condition, FIG. 3) is satisfied, transmit an indicator indicative of presence of the measurement value of the radio quality to the base station in the connected mode and in response to a request from the base station, transmit a report signal including the measurement value of the radio quality.

17 Claims, 12 Drawing Sheets

|  | REPORT CONDITION 1: PRESENCE OF SAMPLE | REPORT CONDITION 2: 90% OF BUFFER REPORT CONDITION 3: EXPIRATION OF TIMER |
|---|---|---|
| MEASUREMENT VALUE DELETION CONDITION 1: DELETE IMMEDIATELY AFTER REPORTING | MODEL 1 | MODEL 3 |
| MEASUREMENT VALUE DELETION CONDITION 2: DELETE AFTER SUCCESS OF REPORTING | MODEL 2 | MODEL 4 |

(56) References Cited

OTHER PUBLICATIONS

3GPP TS 37.320 V11.0.0; "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)"; Jun. 2012 (20 pages).

3GPP TS 37.320 V0.4.0, "3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10)," Apr. 2010 (10 pages).

International Preliminary Report on Patentability from PCT/JP2011/060074 mailed on Dec. 10, 2012 (6 pages).

Orange, et al., "MDT Measurement Model," 3GPP TSG RAN WG2 #68bis; R2-100239; Valencia, Spain; Jan. 18-22, 2010 (3 pages).

Motorola, "Triggering of Reporting of MDT Measurements," 3GPP TSG RAN WG2 #68bis, R2-100261; Valencia, Spain; Jan. 18-22, 2010 (3 pages).

Vodafone, "Mechanisms for Delayed Reporting in Connected Mode," 3GPP TSG RAN WG2 #69, R2-101297; San Francisco, USA; Feb. 22-26, 2010 (5 pages).

Kyocera, "MDT log deletion issue after 48-hour timer expiry," 3GPP TSG RAN WG2 #71bis, R2-105605; Xi'an, China; Oct. 11-15, 2010 (2 pages).

Extended European Search Report issued in European Application No. 11774962.2, dated Jan. 7, 2014, (9 pages).

* cited by examiner

FIG.3

| | REPORT CONDITION 1: PRESENCE OF SAMPLE | REPORT CONDITION 2: 90% OF BUFFER. REPORT CONDITION 3: EXPIRATION OF TIMER |
|---|---|---|
| MEASUREMENT VALUE DELETION CONDITION 1: DELETE IMMEDIATELY AFTER REPORTING | MODEL 1 | MODEL 3 |
| MEASUREMENT VALUE DELETION CONDITION 2: DELETE AFTER SUCCESS OF REPORTING | MODEL 2 | MODEL 4 |

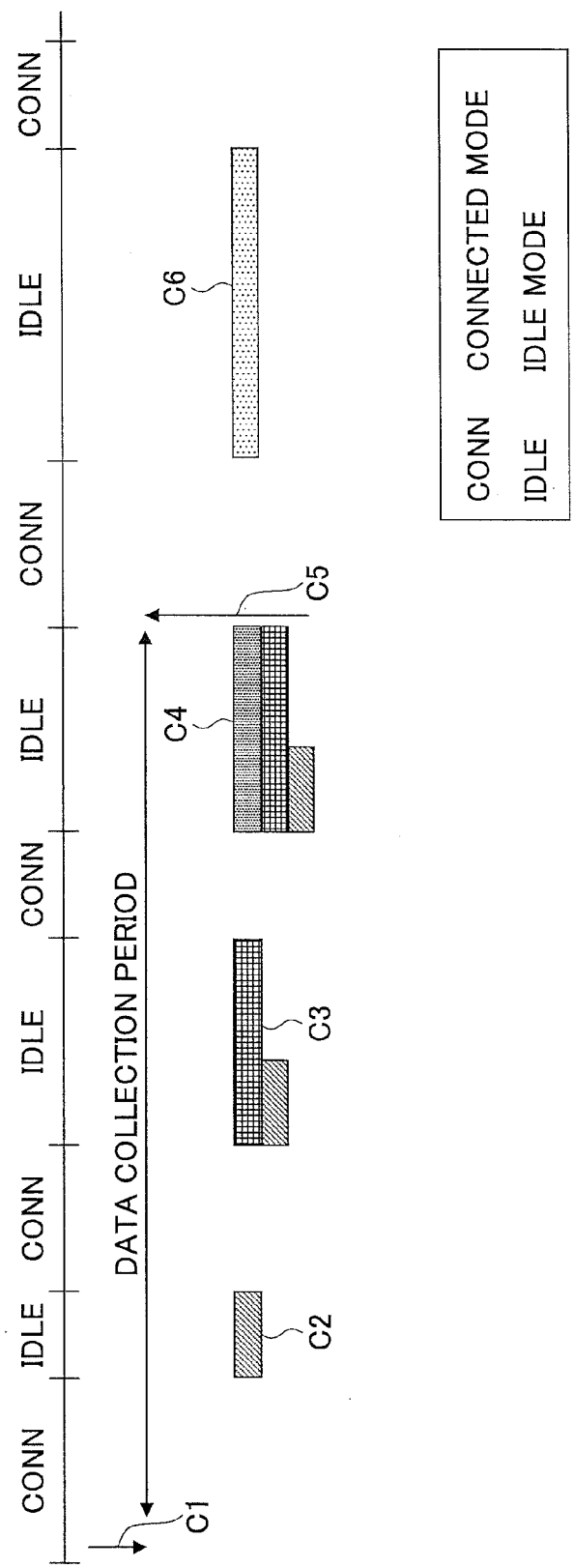

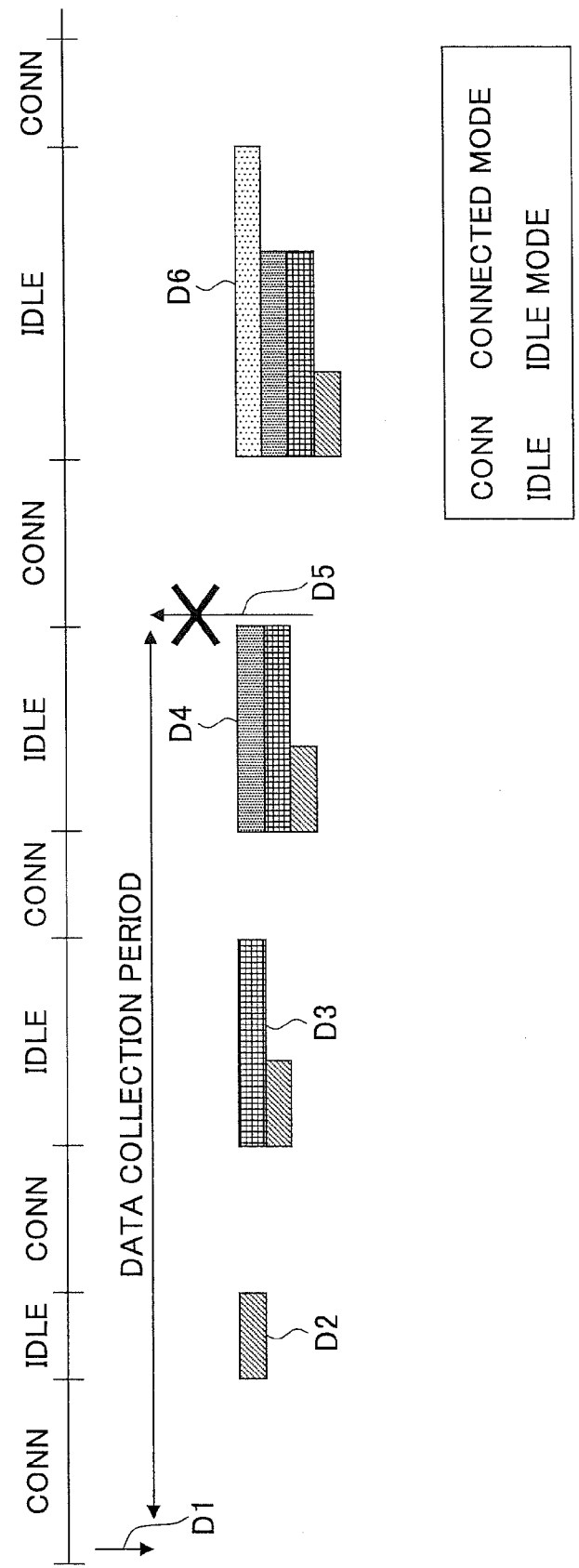

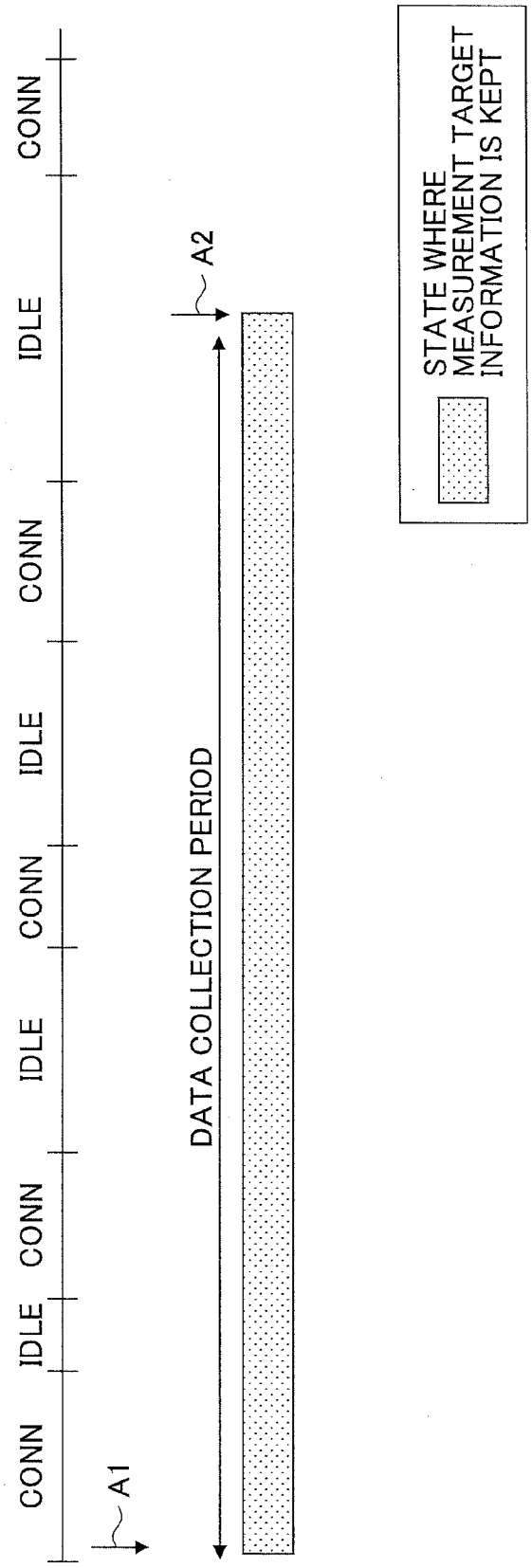

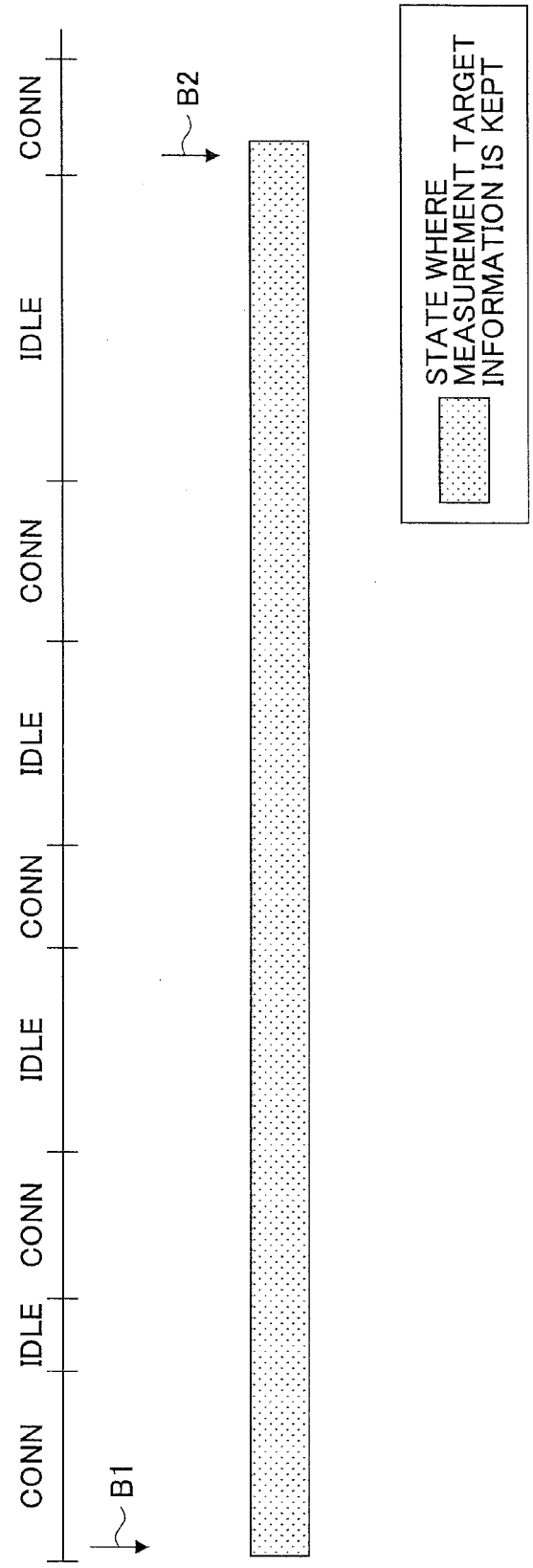

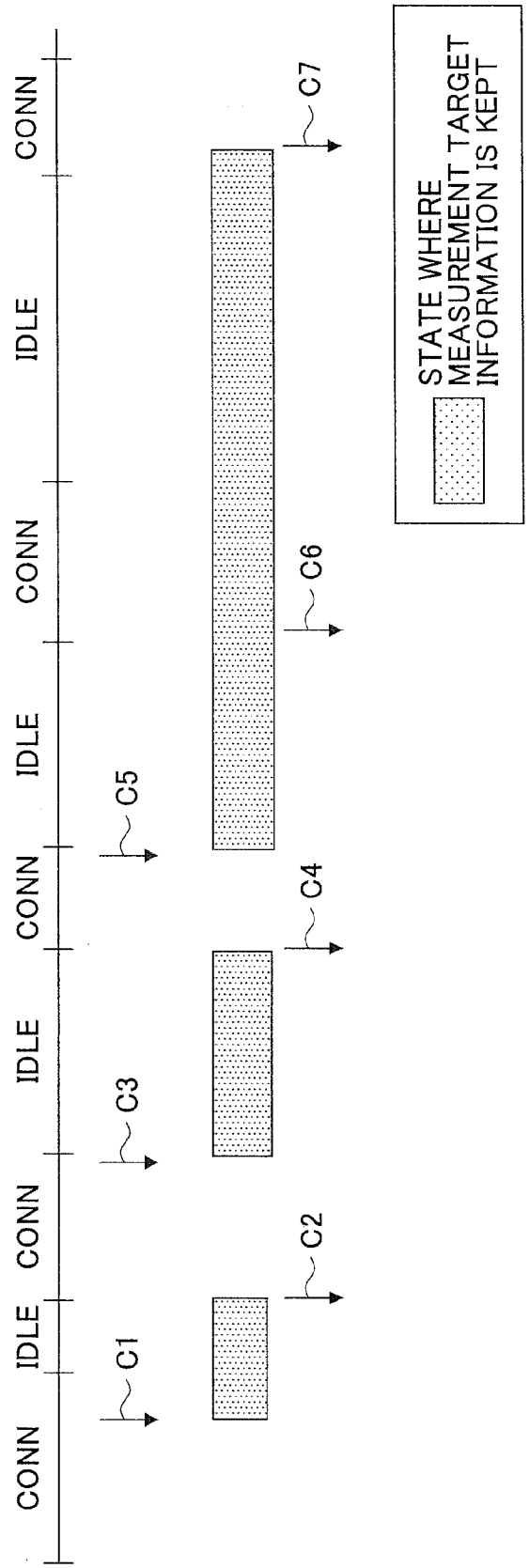

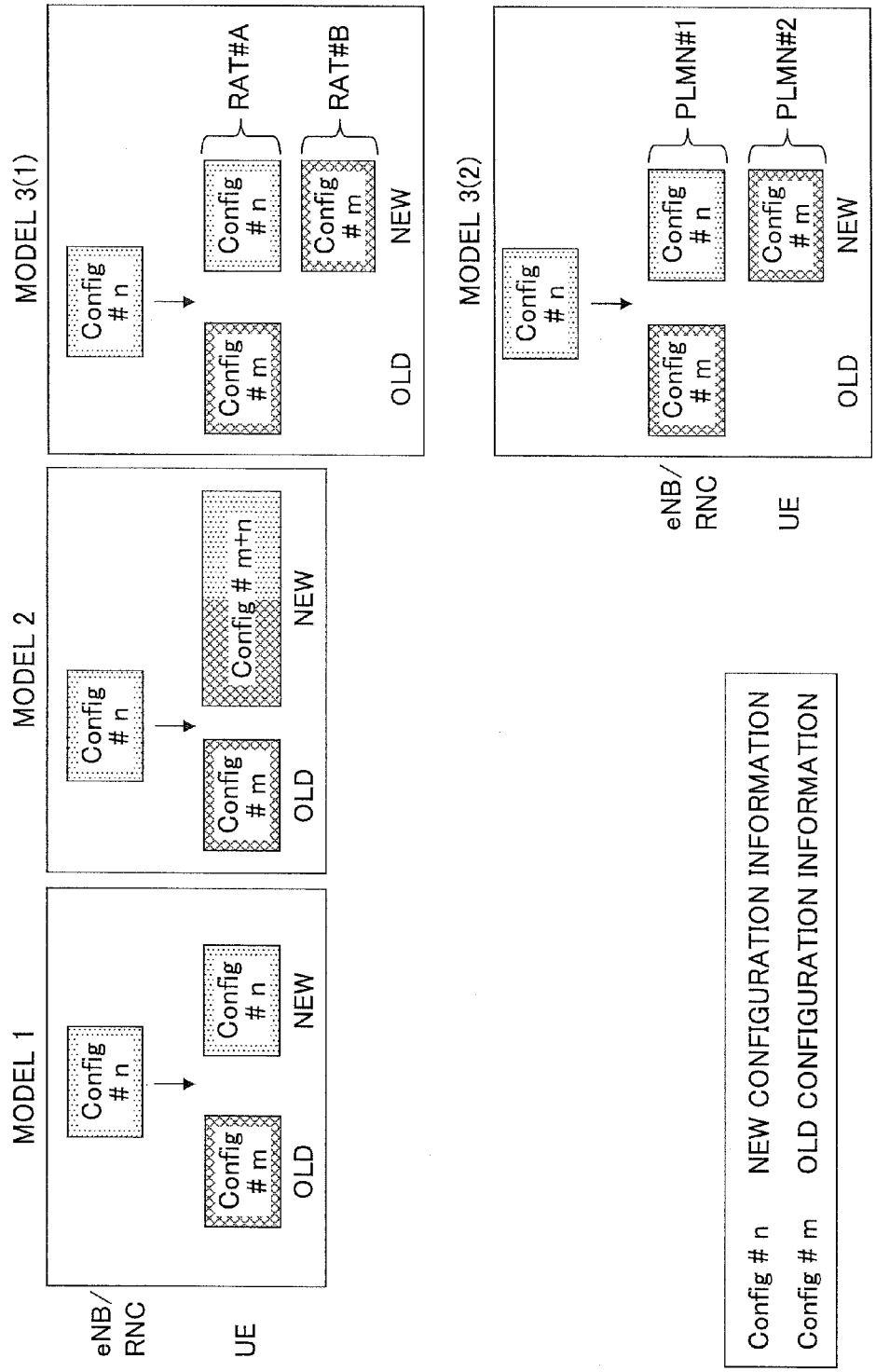

USER EQUIPMENT AND METHOD IN MOBILE COMMUNICATION SYSTEM

TECHNICAL FIELD

The disclosed invention relates to a user equipment and a method in a mobile communication system.

BACKGROUND ART

A communication condition in a radio network changes depending on the distance to a base station, a surrounding environment, time and so on. Accordingly, an administrator or an operator of the radio network must always comprehend quality conditions in various areas or cells in the radio network and strive to improve the radio quality.

A straightforward method for measuring the quality condition in the various areas is that the operator visits these areas to measure electrical waves therein. This method is called a Drive Test. However, if the operator investigates all the areas periodically and conducts the drive test to determine which areas are to be improved, there is a risk that the associated cost may become substantially high.

From this viewpoint, a technique is currently being discussed for causing user equipments or user apparatuses residing in the areas instead of the operator to measure the radio quality therein and report measurement results to the operator. This technique is called a Minimization of Drive Test (MDT). The MDT is described in Non-Patent Document 1, for example.

RELATED-ART DOCUMENTS

Non-Patent Document

Non-Patent Document 1: 3GPP TS37.320

SUMMARY OF INVENTION

Problem to be Solved by the Invention

However, specific specifications for implementing the MDT have not been determined at least at filing date of the present application.

One object of the disclosed invention is to provide a user equipment and a method for enabling a management node in a radio network to obtain quality information on the radio network easily and efficiently.

Means for Solving the Problem

One aspect of the disclosed invention relates to a user equipment having operating modes of at least a connected mode and an idle mode, comprising: a measurement unit configured to measure radio quality in the idle mode in accordance with measurement target information indicating that the user equipment is preset to report a measurement value of the radio quality to a base station; a storage unit configured to store the measurement target information and the measurement value of the radio quality measured by the measurement unit; and a transmitting unit configured to, if a predefined report condition is satisfied, transmit an indicator indicative of presence of the measurement value of the radio quality to the base station in the connected mode and in response to a request from the base station, transmit a report signal including the measurement value of the radio quality.

Advantage of the Invention

According to the disclosed invention, it is possible to provide a user equipment and a method for enabling a management node in a radio network to obtain quality information on the radio network easily and efficiently.

BRIEF DESCRIPTION OF DRAWINGS

FIG. 3 illustrates exemplary combinations of report conditions and measurement value deletion conditions;

FIG. 4C illustrates an exemplary operation in a case (Model 3) of a combination of Report condition 2/3 and Measurement value deletion condition 1;

FIG. 4D illustrates an exemplary operation in a case (Model 4) of a combination of Report condition 2/3 and Measurement value deletion condition 2;

FIG. 5A illustrates a case where measurement target information is deleted according to Deletion condition 1;

FIG. 5B illustrates a case where measurement target information is deleted according to Deletion condition 2;

FIG. 5C illustrates a case where measurement target information is deleted according to Deletion condition 3;

FIG. 6 illustrates a method for updating measurement target information; and

EMBODIMENTS FOR CARRYING OUT THE INVENTION

Embodiments are described with respect to viewpoints as follows.

1. System
2. Report condition
3. Measurement value deletion condition
4.1. Model 1
4.2. Model 2
4.3. Model 3
4.4. Model 4
5. Deletion condition of measurement target information
6. Exemplary operation for deleting measurement target information
7. Updating measurement target information

Embodiment 1

[1. System]

Figure 1:
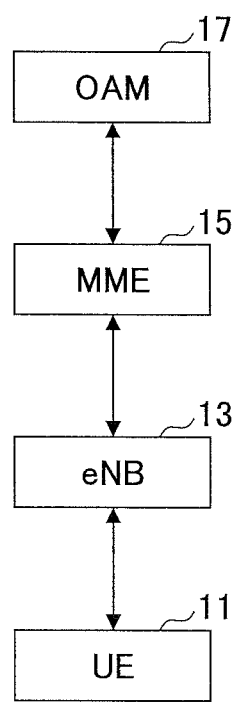
FIG. 1 schematically illustrates a system for use in one embodiment.

FIG. 1 schematically illustrates a system for use in one embodiment. In FIG. 1, functional elements particularly relating to this embodiment in various functional elements in a mobile communication system are exemplarily illustrated. In FIG. 1, a user equipment (UE) 11, a base station (eNB) 13, a switching station (MME) 15 and a network management node (OAM) 17 are illustrated. For convenience, the present embodiment is described with reference to some terminologies in E-UTRAN, but this is not essential to the present invention. The present invention can be applied to various communication systems. For example, the present invention may be applied to a W-CDMA based system, an HSDPA/HSUPA based W-CDMA system, an LTE based system, an LTE-Advanced based system, an IMT-Advanced based system, a WiMAX, a Wi-Fi based system on so on. For example, a radio network controller (RNC) may be provided as an upper station of the base station.

The user equipment (UE) 11 is typically a mobile station, although the user equipment may be a fixed station. The user equipment (UE) 11 may be any appropriate apparatus that can measure and report radio quality. For example, the user equipment (UE) 11 may be, but is not limited to, a cellular phone, an information terminal, a personal digital assistant, a portable personal computer and so on. The user equipment (UE) 11 is described in detail below with reference to FIG. 2.

The base station (eNB) 13 wirelessly communicates with the user equipment (UE) 11 to communicate with the switching station 15 (typically in wired communication). For example, the base station (eNB) 13 performs scheduling to assign radio downlink resources and radio uplink resources. The user equipment (UE) 11 can perform radio communication by using the scheduled resources.

The switching station (MME) 15 is provided as an upper station of the base station and is responsible for subscriber information management, mobility management, incoming and outgoing call control, charge control, QoS control and so on.

The network management node (OAM) 17 collects measurement values of radio quality in various areas in the radio network and sends the switching station (MME) 15 and/or the base station (eNB) 13 indications for improving quality of the radio network. For example, the network management node (OAM) 17 transmits an indication to change transmit power of electrical waves transmitted in the direction of a certain area, an indication to change the number of connecting users and so on.

Figure 2:
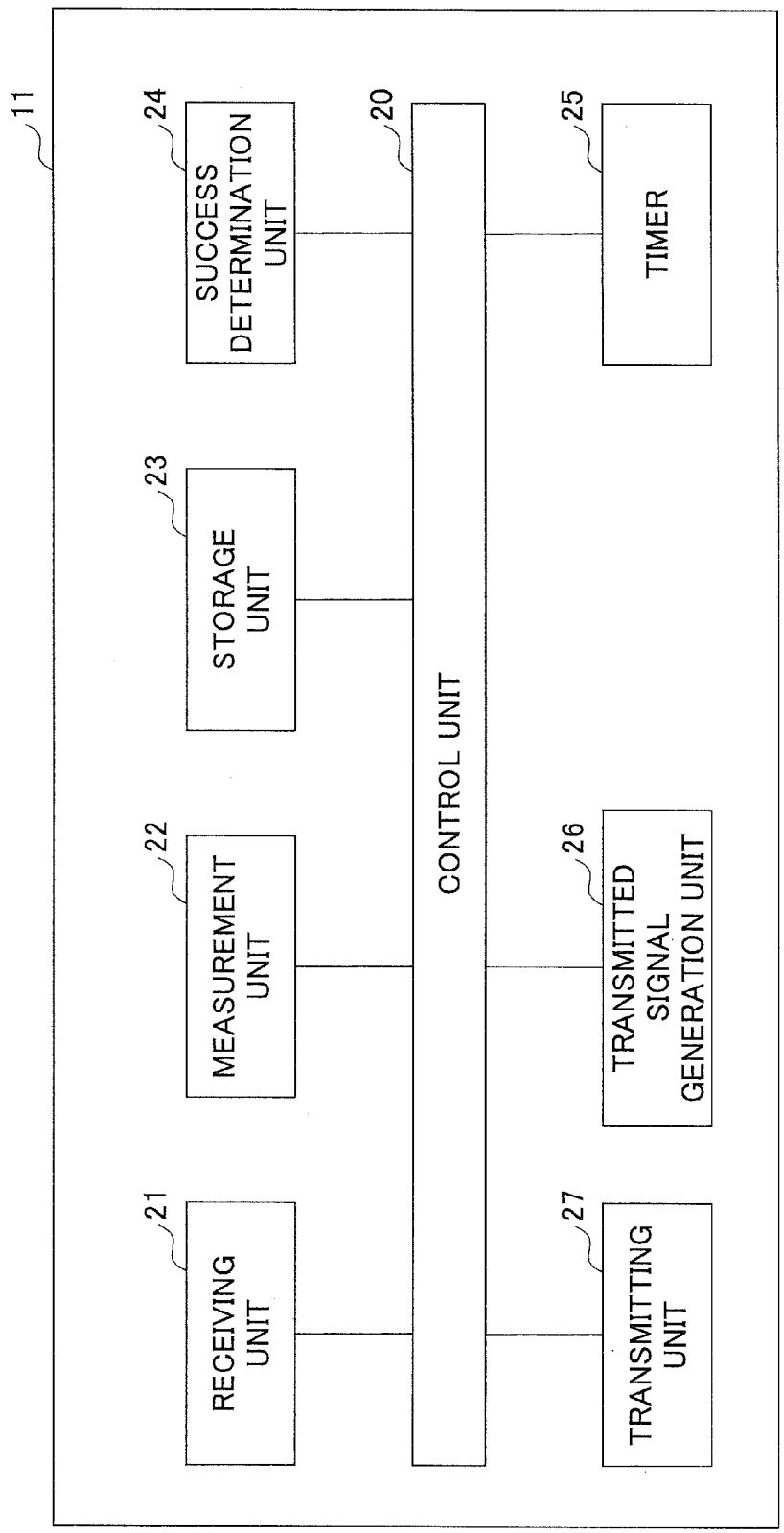
FIG. 2 illustrates a user equipment (UE)

FIG. 2 illustrates the user equipment (UE) 11. In FIG. 2, functional elements particularly relating to this embodiment in various functional elements provided to the user equipment 11 are exemplarily illustrated. In FIG. 2, a control unit 20, a receiving unit 21, a measurement unit 22, a storage unit 23, a success determination unit 24, a timer 25, a transmitted signal generation unit 26 and a transmitting unit 27 are illustrated.

The control unit 20 controls operations of the various functional elements in the user equipment (UE) 11.

The receiving unit 21 receives radio signals from the base station (eNB) 13 and demodulates and decodes the received radio signals.

The measurement unit 22 measures radio quality based on the received radio signals. As one example, the measurement unit 22 can find a measurement value of the radio quality based on a reception level of a pilot signal in the received signals. The reception level may be represented as receive power, a received signal strength indication (RSSI), received signal code power (RSCP), a pathloss, a signal to interference ratio (SIR), a signal to interference and noise ratio (SINR), a signal to noise ratio (S/N), a carrier to noise ratio (C/N), an $E_c/N_0$ and so on.

The storage unit 23 stores various data and information needed in operations of the user equipment (UE) 11. For example, the storage unit 23 stores measurement values measured by the measurement unit 22 as well as measurement target information. The measurement target information is transmitted from the network management node (OAM) 17 to the user equipment (UE) 11 via the base station (eNB) 13. The measurement target information is information for indicating that the user equipment is preset or configured to report the measurement value of radio quality to the network management node (OAM) 17 and may be referred to as configuration information or policy information in a sense that a measurement target is specified. The measurement target can be determined from various viewpoints. For example, the measurement target information includes position information such as a user's resident area or cell, user's contract type information (for example, user's agreement of reporting radio quality), capability information on the user equipment (for example, installation of software or hardware items sufficient to report the radio quality), information indicating from which vendor the user equipment is manufactured or offered, event information for measurement and so on. The event information may indicate that the measurement should be performed when a reception level from a serving cell falls below a predefined threshold, for example.

The success determination unit 24 determines whether the radio quality has been successfully reported from the user equipment (UE) 11. This determination may be made in any existing appropriate manner in this technical field. For example, the success determination unit 24 may make the success determination by receiving an acknowledgement signal (a positive response (ACK) or a negative response (NACK)) to a signal transmitted from the user equipment (UE) 11. Alternatively, transmission failure may be associated with the fact that the user equipment (UE) 11 has failed to receive the ACK from the base station within a predefined time period after transmission of a signal including a measurement value of radio quality. Also, the transmission failure may be associated with the fact that the user equipment (UE) 11 has failed to receive the ACK from the base station yet even after conducting the maximum number of retransmissions. As cases where the user equipment (UE) 11 fails to receive the ACK, there is a case where the base station (eNB) has no function to report a signal including the measurement value to the network management node (OAM) (the case of MDT unsupported base station).

The timer 25 counts passage of a time period in response to a trigger event. Various trigger events can be assumed. The time periods counted by the timer 25 may be a cycle of reporting the measurement values of radio quality, a time period from storage to deletion of the measurement values of radio quality, a time period required to report the radio quality (an effective time period of measurement target information) and so on.

The transmitted signal generation unit 26 generates signals for transmission to the base station (eNB) 13, the switching station (MME) 15 and/or the network management node (OAM) 17. Particularly in this embodiment, the transmitted signal generation unit 26 generates report signals including measurement values of radio quality measured according to measurement target information.

The transmitting unit 27 converts the signals generated by the transmitted signal generation unit 26 into signals for radio transmission and transmits the converted signals over the air.

As stated above, the network management node (OAM) 17 (FIG. 1) must monitor respective conditions of areas in the radio network and improve the quality of the areas. The network management node (OAM) 17 determines specific contents of the above-stated measurement target information or policy information and determines which user equipments are caused to report the measurement values of radio quality. The measurement target information or the policy information is transmitted to the relevant user equipments (UE) 11 via the switching station (MME) 15 and the base station (eNB) 13. Although the policy information and the configuration information are synonymously used in the above usage of terminologies, the policy information and the configuration information may be used differently. For example, a version of the policy information transmitted from the network management node (OAM) 17 converted into the format of an RRC message transmitted from the base station (eNB) 13 to the user equipment (UE) 11 may be referred to as the configuration information.

In any case, in response to a target event occurring in a target area, the user equipment (UE) 11 measures a measurement value of radio quality in accordance with the configuration information. A report signal including a measurement result is transmitted in uplink to the network management node (OAM) 17 via the base station (eNB) 13 and the switching station (MME) 15. In this manner, the network management node (OAM) 17 collects data of the measurement values of radio quality and monitors conditions of the respective areas. The network management node (OAM) 17 analyzes the collected data and transmits an indication to the switching station (MME) 15 and/or the base station (eNB) 13 as needed. For example, the network management node (OAM) 17 may transmit an indication to change the strength of electrical waves for transmission directed to a certain area, an indication to change the number of call connections in a certain area or other indications.

Note that the user equipment (UE) 11 sends the base station (eNB) 13 a measure of downlink quality, such as a channel quality indicator (CQI), periodically or if needed. The CQI is used by the base station (eNB) as determination criteria to assign radio resources to users. The measurement value (for example, a reception level) measured and reported by the user equipment (UE) 11 of this embodiment is also a physical quantity similar to the CQI in that they are quantities representing the radio quality. However, the measurement value measured and reported by the user equipment (UE) 11 of this embodiment is reported to the network management node (OAM) 17, which is an upper node of the base station (eNB), and is used by the network management node (OAM) 17 to monitor conditions of the respective areas. In terms of this point, the measurement value can be significantly differentiated from the CQI used as determination criteria to assign radio resources to individual users.

[2. Report Condition]

Operating modes of the user equipment at least include a connected mode and an idle mode. In the connected mode, the user equipment can communicate user traffic data in principle by receiving control signals continuously or per subframe and having radio resources assigned. In the idle mode, the user equipment receives the control signals discontinuously, which can save the battery energy.

The measurement of radio quality conducted upon a request from the network management node (OAM) can be carried out in any of the connected mode and the idle mode. For example, it is conceivable that the user equipment measures the radio quality in the connected mode in accordance with measurement target information and reports a measurement result by using a message such as an RRC message. Alternatively, it is conceivable that the user equipment measures the radio quality in the idle mode, stores the measurement value, and upon transitioning to the connected mode, reports the stored measurement value. The present embodiment can be applied to any of the operating modes, but the latter case is assumed for explanatory convenience. In other words, the user equipment measures the radio quality in the idle mode in accordance with the measurement target information, stores the measurement value and reports the stored measurement value after transitioning to the connected mode. The user equipment, if it is enabled to report the measurement value, sends the base station an indicator indicative of it. Based on the indicator, the base station (eNB) sends the user equipment a request signal to request the measurement value. Upon receiving the report request signal, the user equipment transmits a report signal including the measurement value.

Some conditions to transmit the indicator indicating that the user equipment is enabled to report the measurement value may be considered as follows.

Report condition 1: Case where some data of measurement values exist.

If data of at least one measurement value is stored in the storage unit, the indicator is transmitted. This is desirable from the viewpoint of a memory capacity required for the user equipment in that the user equipment does not have to keep and store many measurement values.

Report condition 2: Case where a data amount of measurement values stored in the storage unit reaches a predefined proportion of the storage unit.

For example, if the data of measurement values occupies 90% of a predefined buffer domain, it is indicated that the stored measurement values can be reported. This is desirable from the viewpoint of efficient utilization of network resources required to report (including signaling resources) in that larger amounts of data can be reported at a time, which can decrease the report frequency.

Report condition 3: Case where a predefined time period such as a predefined data collection period expires.

For example, data is being collected during a predefined time period after starting the measurement of radio quality, and upon expiration of the predefined time period, it is indicated that the user equipment is enabled to report the measurement values. This can decrease the report frequency and use network resources required to report efficiently (including signaling resources). Also, it is preferable in that the network management node (OAM) can reliably obtain new measurement values with a predefined frequency.

[3. Measurement Value Deletion Condition]

Since the storage unit of the user equipment can store a limited amount of information, it is desirable to delete stored data of measurement values at any timing. As one example, it is conceivable that the data of measurement values is deleted from the storage unit in cases as follows.

Measurement value deletion condition 1: Case where the user equipment has sent a base station (or a network management node) a report signal including a measurement value of radio quality.

In other words, if the user equipment has received a request signal to request to report the measurement value, the measurement value is deleted from the storage unit immediately after transmission of a report signal including the measurement value. This is preferred from the viewpoint of simpler operations or others.

Measurement value deletion condition 2: Case where it has been confirmed that a report signal has been successfully transmitted after the user equipment transmits the report signal.

In other words, if the report signal has been successfully transmitted, the measurement value is deleted whereas if the successful transmission has not been confirmed, the measurement value is kept in the storage unit without deleting the measurement value. This is preferred from the viewpoint of secured transmission of the measurement value of radio quality to the base station (eNB) or the network management node (OAM) or others. In the case of the above Measurement value deletion condition 1, the measurement value is deleted without confirmation of the success of transmission immediately after transmission of the report signal. The success confirmation may be made in any appropriate manner in this technical field. For example, the fact that the base station has replied with a positive response (ACK) to the report signal to the user equipment may be associated with the success of reporting. Alternatively, the fact that the user equipment has not received the positive response (ACK) from the base station within a predefined time period after transmission of the report signal may be associated with failure of transmission. Also, the fact that the user equipment has not received the positive response (ACK) from the base station within the maximum number of retransmissions by the user equipment may be associated with the failure of transmission.

[4. Exemplary Operations to Report And Delete Measurement Value]

For each of Report conditions 1-3, Measurement value deletion conditions 1-2 can be applied. On the other hand, other conditions as set forth may be combined.

FIG. 3 illustrates exemplary combinations of Report conditions 1-3 and Measurement value deletion conditions 1-2. Although Report conditions 2 and 3 are illustrated together in FIG. 3 for simplicity of illustration and explanation, Report conditions 2 and 3 are mutually independent conditions. In other words, Measurement value deletion condition 1 or 2 can be applied to Report condition 2, and Measurement value deletion condition 1 or 2 can be applied to Report condition 3. In FIG. 3, Models 1-4 are denoted depending on combination patterns of Report conditions and Measurement value deletion conditions for convenience.

[4.1. Model 1]

Model 1 is a combination of Report condition 1 and Measurement value deletion condition 1. In the case where data of a measurement value exists, when a user equipment transitions to the connected mode, the user equipment transmits an indicator indicative of the presence of the measurement value to a base station (eNB) or a network management node (OAM). In response to a request from the eNB or the OAM, the user equipment transmits a report signal including the measurement value and deletes the measurement value immediately after the transmission. This is preferred from the viewpoint of simpler operations or others.

Figure 4A:
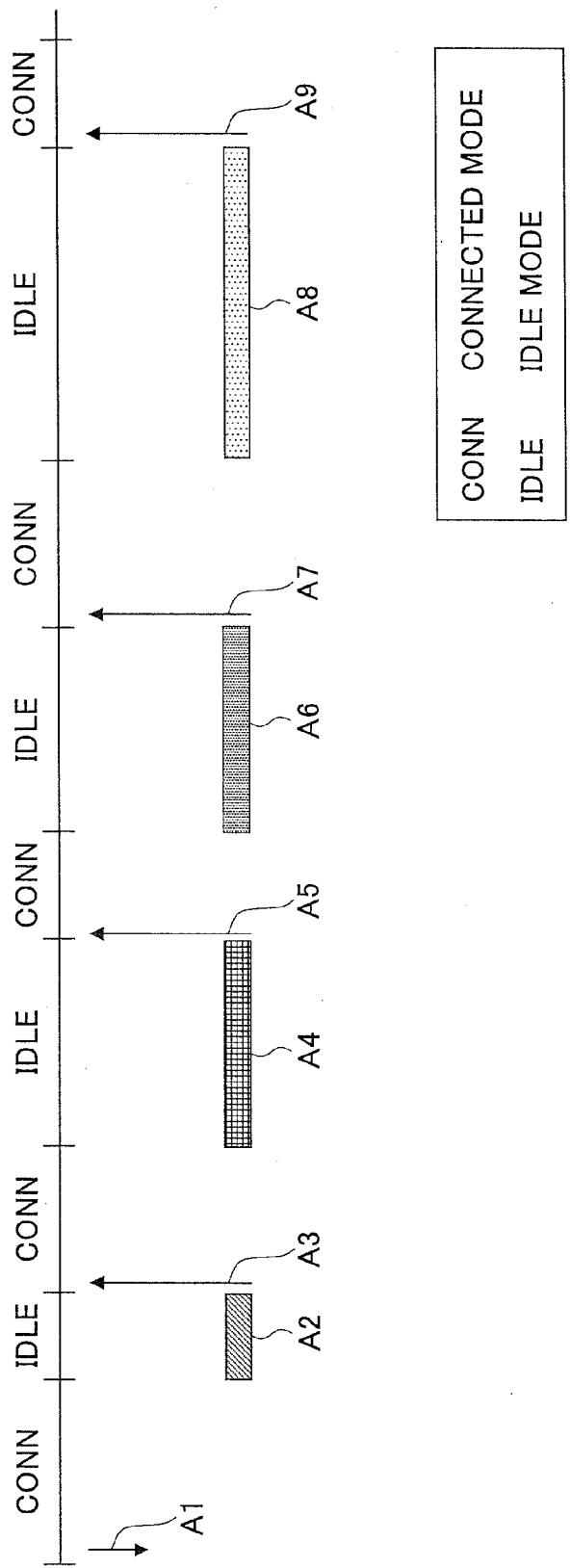
FIG. 4A illustrates an exemplary operation in a case (Model 1) of a combination of Report condition 1 and Measurement value deletion condition 1.

FIG. 4A illustrates an exemplary operation for Model 1. In general, the horizontal axis corresponds to the course of time, and the user equipment operates in the connected mode (CONN) and the idle mode (IDLE) alternately. As illustrated in the left side in FIG. 4A, when the user equipment operates in the connected mode, at step A1, the user equipment receives measurement target information (configuration information) and stores it in the storage unit. As stated above, the measurement target information indicates that the user equipment must report radio quality to a network management node (OAM). As one example, the measurement target information includes information indicative of an area and an event (the reception level of a serving cell falling below a threshold), but the measurement target information can be determined from various viewpoints.

At step A2, the user equipment transitions to the idle mode, measures the radio quality in accordance with the measurement target information and stores a measurement result in the storage unit. For example, if the reception level of the serving cell falls below the threshold, the user equipment can obtain the measurement value by measuring the reception level of a pilot signal from the serving cell. In FIG. 4A, the strip-shaped portions such as steps A2, A4, A6 and A8 also indicate that the measurement values are stored. This holds in other drawings.

At step A3, the user equipment transitions to the connected mode. The user equipment transmits a report signal including the measurement value stored in the storage unit. In Model 1, the measurement value is deleted immediately after the transmission. After that, the user equipment similarly measures the radio quality in the idle mode and stores the measurement value (A4, A6, A8). After transitioning to the connected mode, the user equipment reports the measurement value and deletes the measurement value (A5, A7, A9).

[4.2. Model 2]

Model 2 is a combination of Report condition 1 and Measurement value deletion condition 2. In the case where data of a measurement value exist, when a user equipment transitions to the connected mode, the user equipment transmits an indicator indicative of the presence of the measurement value to a base station (eNB) or a network management node (OAM). In response to a request from the eNB or the OAM, the user equipment transmits a report signal including the measurement value and if the user equipment has confirmed that the report signal has been successfully transmitted, deletes the measurement value. This is preferred from the viewpoint of secured reporting of the measurement value or others.

Figure 4B:
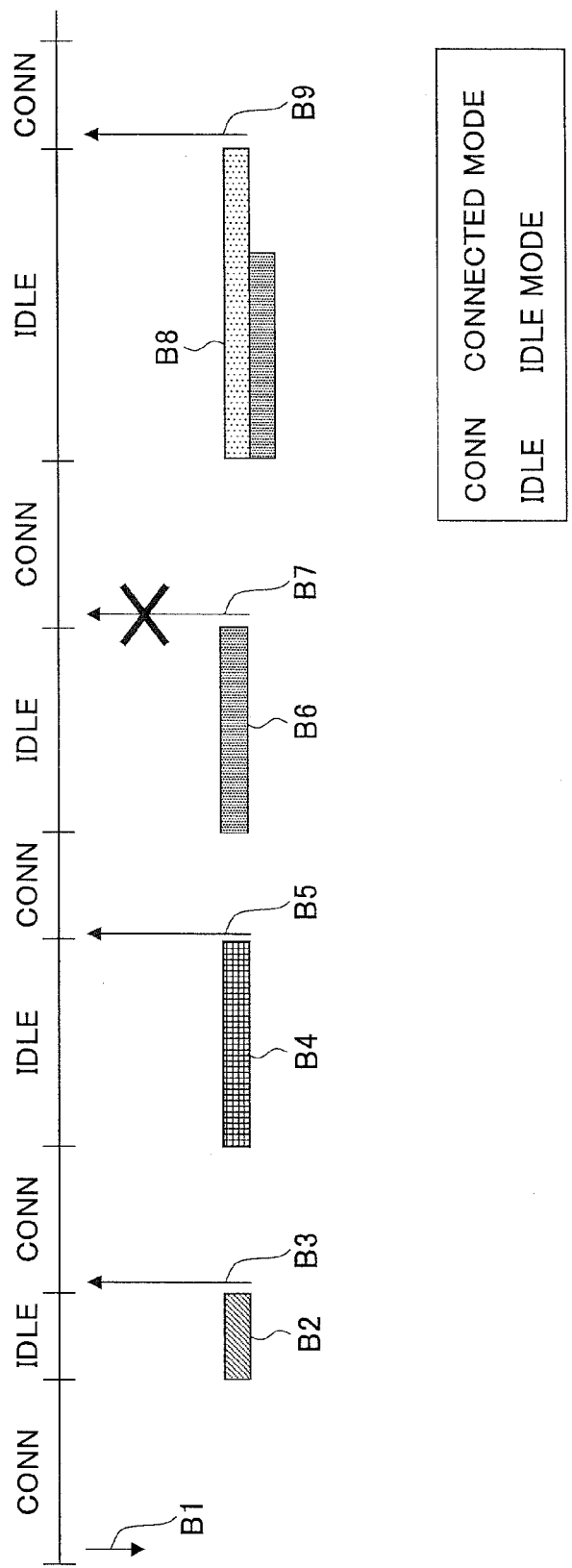
FIG. 4B illustrates an exemplary operation in a case (Model 2) of a combination of Report condition 1 and Measurement value deletion condition 2.

FIG. 4B illustrates an exemplary operation for Model 2. At step B1, the user equipment receives measurement target information (configuration information) and stores it in the storage unit.

At step B2, the user equipment transitions to the idle mode, measures the radio quality in accordance with the measurement target information and stores a measurement result in the storage unit.

At step B3, the user equipment transitions to the connected mode. The user equipment transmits a report signal including the measurement value stored in the storage unit. In Model 2, if the user equipment has confirmed that the report signal has been successfully transmitted, the user equipment deletes the measurement value. For explanatory convenience, it is assumed that the report signal has been successfully transmitted at step B3.

At step B4, the user equipment transitions to the idle mode, measures the radio quality in accordance with the measurement target information and stores a measurement result in the storage unit.

At step B5, the user equipment transitions to the connected mode. The user equipment transmits a report signal including the measurement value stored in the storage unit. For explanatory convenience, it is assumed that the report signal has been successfully transmitted at step B5.

At step B6, the user equipment transitions to the idle mode, measures the radio quality in accordance with the measurement target information and stores a measurement result in the storage unit.

At step B7, the user equipment transitions to the connected mode. The user equipment transmits a report signal including the measurement value stored in the storage unit. For explanatory convenience, it is assumed that the report signal has not been successfully transmitted. In this case, the transmitted measurement value is kept in the storage unit without deletion.

At step B8, the user equipment transitions to the idle mode, measures the radio quality in accordance with the measurement target information and stores a measurement result in the storage unit. Accordingly, the old measurement value stored at step B6 and the newly stored measurement value would coexist in the storage unit.

At step B9, the user equipment transitions to the connected mode. The user equipment transmits a report signal including both the old measurement value and the new measurement value stored in the storage unit. If the report signal has been successfully transmitted at step B9, both the old and new measurement values are deleted from the storage unit. Otherwise, the measurement values are kept without deletion similar to the above case.

[4.3. Model 3]

Model 3 is a combination of Report condition 2 or 3 and Measurement value deletion condition 1. When a data amount of measurement values stored in the storage unit occupies a predefined proportion in the storage unit or when a predefined data collection period expires, the user equipment transmits an indicator indicative of the presence of the measurement values to a base station (eNB) or a network management node (OAM). In response to a request from the eNB or the OAM, the user equipment transmits a report signal including the measurement values. The user equipment deletes the measurement values from the storage unit immediately after the transmission of the report signal. This is preferred in that some amount of measurement values can be reported immediately.

FIG. 4C illustrates an exemplary operation for Model 3. At step C1, the user equipment receives measurement target information (configuration information) and stores it in the storage unit. After that, the user equipment starts to count passage of a predefined data collection period. For example, a timer is activated.

At step C2, the user equipment transitions to the idle mode, measures the radio quality in accordance with the measurement target information and stores a measurement result in the storage unit. After that, the user equipment transitions to the connected mode. Unlike Models 1 and 2, the measurement value is not reported, because the data collection period has not expired yet.

At step C3, the user equipment transitions to the idle mode, measures the radio quality in accordance with the measurement target information and stores a measurement result in the storage unit. The measurement value stored in step C2 also exists in the storage unit. After that, the user equipment transitions to the connected mode. Since the data collection period has not expired, the measurement values are not also reported at this timing.

At step C4, the user equipment transitions to the idle mode, measures the radio quality in accordance with the measurement target information and stores a measurement result in the storage unit. The measurement values stored at steps C2 and C3 also exist in the storage unit. In the illustrated case, it is assumed that the data collection period has expired at the end timing of the idle mode. In this case, as illustrated in step C5, when the user equipment transitions to the connected mode, the measurement values are reported. In Model 3, Measurement value deletion condition 1 is applied, and the measurement values are deleted from the storage unit after reporting the measurement values.

At step C6, the user equipment transitions to the idle mode, measures the radio quality in accordance with the measurement target information and stores a measurement result in the storage unit. Since the measurement values are deleted at the timing of step C5, only the newly measured data exists in the storage unit.

Note that if Report condition 3 is applied instead of Report condition 2, the user equipment can operate similarly by replacing "a period until the data collection period expires" with "a period until a proportion of data of measurement values occupied in a storage area reaches a predefined value (for example, 90%)".

[4.4. Model 4]

Model 4 is a combination of Report condition 2 or 3 and Measurement value deletion condition 2. When a data amount of measurement values stored in the storage unit reaches a predefined proportion in the storage unit or when a predefined data collection period expires, the user equipment transmits an indicator indicative of the presence of the measurement values to a base station (eNB) or a network management node (OAM) and in response to a request from the eNB or the OAM, transmits a report signal including the measurement values. If the user equipment has confirmed that the report signal has been successfully transmitted, the user equipment deletes the measurement values. This is preferred in that some amount of measurement values can be reliably reported.

FIG. 4D illustrates an exemplary operation for Model 4. At step D1, the user equipment receives measurement target information (configuration information) and stores it in the storage unit. After that, the user equipment starts to count passage of the predefined data collection period. For example, a timer is activated.

At step D2, the user equipment transitions to the idle mode, measures the radio quality in accordance with measurement target information and stores a measurement result in the storage unit.

At step D3, the user equipment transitions to the idle mode, measures the radio quality in accordance with the measurement target information and stores a measurement result in the storage unit. The measurement value stored at step D2 also exists in the storage unit.

At step D4, the user equipment transitions to the idle mode, measures the radio quality in accordance with the measurement target information and stores a measurement result in the storage unit. The measurement values stored at steps D2 and D3 also exist in the storage unit. In the illustrated case, it is assumed that the data collection period has expired at an end timing of the idle mode. In this case, as illustrated in step D5, when the user equipment transitions to the connected mode, the measurement values are reported. It is assumed that the report signal has not been successfully transmitted at step D5 for explanatory convenience. In this case, the transmitted measurement values are kept in the storage unit without deletion.

At step D6, the user equipment transitions to the idle mode, measures the radio quality in accordance with the measurement target information and stores a measurement result in the storage unit. At the timing of step D5, all the measurement values are kept in the storage unit without deletion. Although not illustrated, the measurement values are kept in the storage unit until the report signal is successfully transmitted.

Note that if Report condition 3 is applied instead of Report condition 2, the user equipment can operate similarly by replacing "a period until the data collection period expires" with "a period until a proportion of data of measurement values occupied in a storage area reaches a predefined value (for example, 90%)".

[5. Deletion Condition of Measurement Target Information]

In the case where the radio quality is measured in the idle mode, the measurement target information (configuration information or policy information) may be applied to any number of periods of the idle mode. For example, in the cases as illustrated in FIGS. 4A-4D, the same measurement target information is applied throughout the four periods of the idle mode. However, this is not essential. An effective period of the single measurement target information can be limited from various viewpoints. For example, the measurement target information may be deleted in cases as set forth. Upon deletion of the measurement target information, the user equipment no longer has to report the radio quality.

Deletion condition 1: Case where a predefined period, such as a predefined data collection period, expires.

For example, the measurement target information is deleted after passage of a predefined period since reception of the measurement target information. This is preferred in that the reportable period of radio quality by the user equipment can be limited to the predefined period, which can prevent the user equipment from being overloaded.

Deletion condition 2: Case where the user equipment has received an indication from an upper apparatus such as a base station (eNB) or a network management node (OAM) indicating that the user equipment does not have to report the radio quality.

This is preferred in that unnecessary measurements and reports from the user equipment can be stopped after completion of data collection by the upper apparatus, for example.

Deletion condition 3: Case where the user equipment has confirmed successful transmission of a report signal after transmitting the report signal including a measurement value.

In other words, if the report signal has not been successfully transmitted, the measurement target information is not deleted, and the user equipment is not released from reporting obligation of the radio quality. In this case, each time the user equipment enters the idle mode, the measurement values increment. Since information on users that are more likely to fail to transmit the report signal is particularly important to analyses of area conditions, Deletion condition 3 is preferred in that the measurement values from such users can be reliably obtained.

[6. Exemplary Operations to Delete Measurement Target Information]

FIG. 5A illustrates deletion of the measurement target information in accordance with Deletion condition 1. At step A1, the measurement target information is transmitted to the user equipment and stored therein. After that, the measurement target information is kept in a predefined period indicated as a data collection period. Accordingly, during this period, each time the user equipment enters the idle mode, the user equipment measures the radio quality, stores the associated measurement value and reports the measurement value in any period of the connected mode.

At step A2, when the data collection period has expired, the measurement target information is deleted. Accordingly, the user equipment no longer has to report the radio quality.

FIG. 5B illustrates deletion of the measurement target information in accordance with Deletion condition 2. At step B1, the measurement target information is transmitted to the user equipment and stored therein. After that, each time the user equipment enters the idle mode, the user equipment measures the radio quality, stores the associated measurement value and reports the measurement value in any period of the connected mode.

At step B2, when the user equipment receives an indication to indicate that the user equipment no longer has to report the radio quality, the measurement target information is deleted. In response, the user equipment is released from reporting obligation of the radio quality.

FIG. 5C illustrates deletion of the measurement target information in accordance with Deletion condition 3. At step C1, the measurement target information is transmitted to the user equipment and stored therein. When the user equipment enters the idle mode, the user equipment measures the radio quality, stores the associated measurement value and reports the measurement value in the next occasion of the connected mode. For explanatory convenience, it is assumed that the user equipment has confirmed that the measurement value has been successfully reported. In this case, the measurement target information is deleted from the storage unit at step C2.

At step C3, the measurement target information is transmitted to the user equipment and stored in the storage unit. When the user equipment enters the idle mode, the user equipment measures the radio quality, stores the associated measurement value and reports the measurement value in the next occasion of the connected mode. For explanatory convenience, it is assumed that the user equipment has confirmed that the measurement value has been successfully reported. In this case, the measurement target information is deleted from the storage unit at step C4.

At step C5, the measurement target information is transmitted to the user equipment and stored in the storage unit. When the user equipment enters the idle mode, the user equipment measures the radio quality, stores the associated measurement value and reports the measurement value in the next occasion of the connected mode. For explanatory convenience, it is assumed that the measurement value has not been successfully reported. In this case, the measurement target information is kept without deletion (step C6). As a result, the user equipment is not released from the reporting obligation of the radio quality, and when the user equipment enters the idle mode, the user equipment still measures the radio quality, stores the associated measurement value and reports the measurement value in the next occasion of the connected mode. For explanatory convenience, it is assumed that the user equipment has confirmed that the measurement value has been successfully reported. In this case, at step C7, the measurement target information is deleted from the storage unit. In response, the user equipment no longer has to report the radio quality.

[7. Update Measurement Target Information]

In the case as illustrated in FIG. 5C, the measurement target information is deleted at an appropriate timing, and new measurement target information is subsequently transmitted to a user equipment. However, if the user equipment already possesses certain measurement target information, there is a case where the user equipment may additionally receive new measurement target information. For example, it may be the case where the user equipment enters a new area. In the case where the user equipment has received the new measurement target information, the user equipment must follow the new measurement target information in any method.

FIG. 6 illustrates specific methods for updating the measurement target information.

Updating method 1 (Model 1): A user equipment replaces measurement target information (Config#m) stored in the storage unit with new measurement target information (Config#n). The old measurement target information (Config#m) is deleted. This method is preferred in that it can be easily implemented in the user equipment. In addition, it is advantageous that a radio access apparatus (a base station (eNB)/a radio network controller (RNC)), a switching apparatus (MME) and a network management node (OAM) do not have to determine by which measurement target information the received measurement value has been obtained.

Updating method 2 (Model 2): A user equipment generates new measurement target information (Config#m+n) by combining measurement target information (Config#m) stored in the storage unit with new measurement target information (Config#n). The combination may be made based on the new measurement target information (Config#n) and a difference between the old measurement target information (Config#m) and the new measurement target information (Config#n). In this case, the comparison and combination of the old and new measurement target information are conducted at the user equipment. For example, it is assumed that the old measurement target information (Config#m) specifies that "when a reception level in area 1 from a serving cell falls under a threshold, the radio quality is measured" and that the new measurement target information (Config#n) specifies that "when a reception level in area 2 from a serving cell falls under a threshold, the radio quality is measured". In this case, the combined measurement target information (Config#m+n) would specify that "when a reception level in area 1 or area 2 from a serving cell falls under a threshold, the radio quality is measured".

Updating method 3 (Model 3): A user equipment keeps measurement target information (Config#m) stored in the storage unit and new measurement target information (Config#n) separately. The user equipment selectively uses the stored measurement target information and the new measurement target information depending on radio access technologies (RATs) or networks (PLMNs). For example, if the user equipment camps in a system of a certain radio access technology (RAT#A), the user equipment measures the radio quality in accordance with the new measurement target information (Config#n). Also, if the user equipment camps in a system of a different radio access technology (RAT#B), the user equipment measures the radio quality in accordance with the old measurement target information (Config#m). Alternatively, if the user equipment camps in a system of a certain network (PLMN#1), the user equipment measures the radio quality in accordance with the new measurement target information (Config#n), and if the user equipment camps in a system of a different network (PLMN#2), the user equipment measures the radio quality in accordance with the old measurement target information (Config#m). Since the user equipment can determine that the user equipment has entered the system of a different radio access technology (RAT), the user equipment can selectively use the old and new measurement target information. Note that identifiers for identifying different sets of measurement target information and different measurement values must be introduced.

Figure 7:
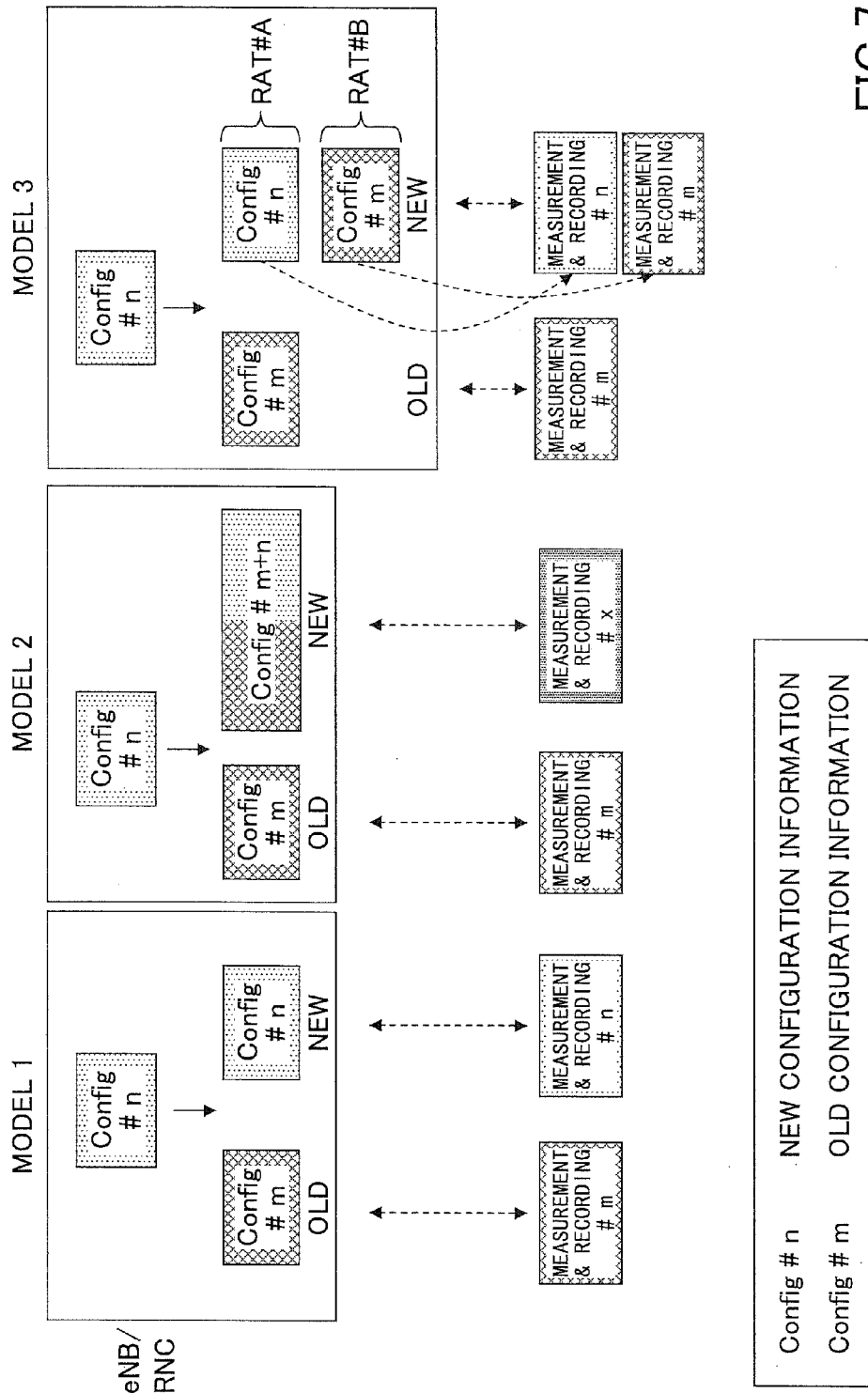
FIG. 7 illustrates measurement target information before and after updating.

FIG. 7 illustrates measurement target information before and after updating. In Model 1, the user equipment measures and records the radio quality based on the old measurement target information (Config#m) before updating. On the other hand, the user equipment measures and records the radio quality based on the new measurement target information (Config#n) after updating. The recording based on Config#m is independent of the measurement and recording based on Config#n, and these measurements and recordings are performed separately.

In Model 2, the user equipment measures and records the radio quality based on the old measurement target information (Config#m) before updating. The user equipment measures and records the radio quality after updating based on measurement target information (Config#m+n) resulting from combination of the old measurement target information and the new measurement target information. The recording based on Config#m is independent of the measurement and recording based on Config#n, and the measurements and recordings are separately performed.

In Model 3, the user equipment measures and records the radio quality based on the old measurement target information (Config#m) before updating. After updating, if the user equipment camps in a system of a certain radio access technology (RAT#A), the user equipment measures the radio quality in accordance with the new measurement target information (Config#n). On the other hand, if the user equipment camps in a system of a different radio access technology (RAT#B), the user equipment measures the radio quality in accordance with the old measurement target information (Config#m). The recording based on Config#m is independent of the measurement and recording based on Config#n, and the measurements and recordings are performed separately.

The present invention has been described with reference to the specific embodiments, but the embodiments are simply illustrative and variations, modifications, alterations and substitutions could be appreciated by those skilled in the art. For example, the present invention may be applied to any appropriate mobile communication system where the MDT is performed. For example, the present invention may be applied to a W-CDMA based system, a HSDPA/HSUPA based W-CDMA system, an LTE based system, an LTE-Advanced based system, an IMT-Advanced based system, a WiMAX, a Wi-Fi based system and so on. In the above description, some specific numerical values are used for better understanding of the present invention. Unless specifically indicated, however, these numerical values are simply illustrative and any other suitable values may be used.

Separation of the embodiments or items are not essential to the present invention, and matters disclosed in two or more items may be combined as needed. A matter disclosed in a certain item may be applied to a matter disclosed in another embodiment or item (if they are not inconsistent with each other). Particularly, conditions and updating methods as disclosed in "2. Report condition", "3. Measurement value deletion condition", "5. Deletion condition of measurement target information" and "7. Updating measurement target information" may be used singularly or in a combination of two or more of them.

For explanatory convenience, apparatuses according to the embodiments of the present invention have been described with reference to functional block diagrams, but these apparatuses may be implemented in hardware, software or combinations thereof. The software may be stored in any appropriate storage medium such as a RAM (Random Access Memory), a flash memory, a ROM (Read-Only Memory), an EPROM, an EEPROM, a register, a hard disk drive (HDD), a removable disk, a CD-ROM, a database and a server. The present invention is not limited to the above embodiments, and variations, modifications, alterations and substitutions can be made by those skilled in the art without deviating from the spirit of the present invention.

This international patent application is based on Japanese Priority Application No. 2010-105996 filed on Apr. 30, 2010, the entire contents of which are hereby incorporated by reference.

The invention claimed is:

1. A user equipment having operating modes of at least a connected mode and an idle mode, comprising:
 a measurement unit configured to measure radio quality in the idle mode in accordance with measurement target information indicating that the user equipment is preset to report a measurement value of the radio quality to a management node;
 a storage unit configured to store the measurement target information and the measurement value of the radio quality measured by the measurement unit; and
 a transmitting unit configured to, if a predefined report condition is satisfied, transmit an indicator indicative of presence of the measurement value of the radio quality to the base station in the connected mode and in response to a request from the base station, transmit a report signal including the measurement value of the radio quality, wherein if a predefined period has expired or if it is confirmed that the report signal has been successfully transmitted, the storage unit deletes the measurement target information, and wherein if a predefined measurement value deletion condition is satisfied, the storage unit deletes the stored measurement value of the radio quality.

2. The user equipment as claimed in claim 1, wherein the measurement value deletion condition is satisfied if it is confirmed that the report signal has been successfully transmitted.

3. The user equipment as claimed in claim 1, wherein the report condition is satisfied if at least one measurement value of the radio quality exists in the storage unit.

4. The user equipment as claimed in claim 1, wherein the report condition is satisfied if the measurement values of the radio quality occupy more than or equal to a predefined amount of a storage area.

5. The user equipment as claimed in claim 1, wherein the report condition is satisfied if a predefined period has expired.

6. The user equipment as claimed in claim 1, wherein the measurement target information includes information items indicative of an area, an event, and a type of the user equipment for a measurement target of the radio quality.

7. A method for use in a user equipment having operating modes of at least a connected mode and an idle mode, comprising:
a measurement unit in the user equipment measuring radio quality in the idle mode in accordance with measurement target information indicating that the user equipment is preset to report a measurement value of the radio quality to a management node;
storing the measurement target information and the measurement value of the radio quality measured by the measurement unit in a storage unit; and
if a predefined report condition is satisfied, transmitting an indicator indicative of presence of the measurement value of the radio quality to a base station in the connected mode and in response to a request from the base station, transmitting a report signal including the measurement value of the radio quality,
wherein if a predefined period has expired or if it is confirmed that the report signal has been successfully transmitted, the storage unit deletes the measurement target information and wherein if a predefined measurement value deletion condition is satisfied, the storage unit deletes the stored measurement value of the radio quality.

8. The user equipment as claimed in claim 2, wherein the report condition is satisfied if at least one measurement value of the radio quality exists in the storage unit.

9. The user equipment as claimed in claim 2, wherein the report condition is satisfied if the measurement values of the radio quality occupy more than or equal to a predefined amount of a storage area.

10. The user equipment as claimed in claim 2, wherein the report condition is satisfied if a predefined period has expired.

11. The user equipment as claimed in claim 2, wherein the measurement target information includes information items indicative of an area, an event, and a type of the user equipment for a measurement target of the radio quality.

12. The user equipment as claimed in claim 3, wherein the measurement target information includes information items indicative of an area, an event, and a type of the user equipment for a measurement target of the radio quality.

13. The user equipment as claimed in claim 4, wherein the measurement target information includes information items indicative of an area, an event, and a type of the user equipment for a measurement target of the radio quality.

14. The user equipment as claimed in claim 5, wherein the measurement target information includes information items indicative of an area, an event, and a type of the user equipment for a measurement target of the radio quality.

15. The user equipment as claimed in claim 8, wherein the measurement target information includes information items indicative of an area, an event, and a type of the user equipment for a measurement target of the radio quality.

16. The user equipment as claimed in claim 9, wherein the measurement target information includes information items indicative of an area, an event, and a type of the user equipment for a measurement target of the radio quality.

17. The user equipment as claimed in claim 10, wherein the measurement target information includes information items indicative of an area, an event, and a type of the user equipment for a measurement target of the radio quality.

\* \* \* \* \*